Jan. 1, 1963  F. TOURTELLOTTE ET AL  3,071,179
TIRE BUILDING APPARATUS AND METHOD
Filed March 30, 1961  2 Sheets-Sheet 2

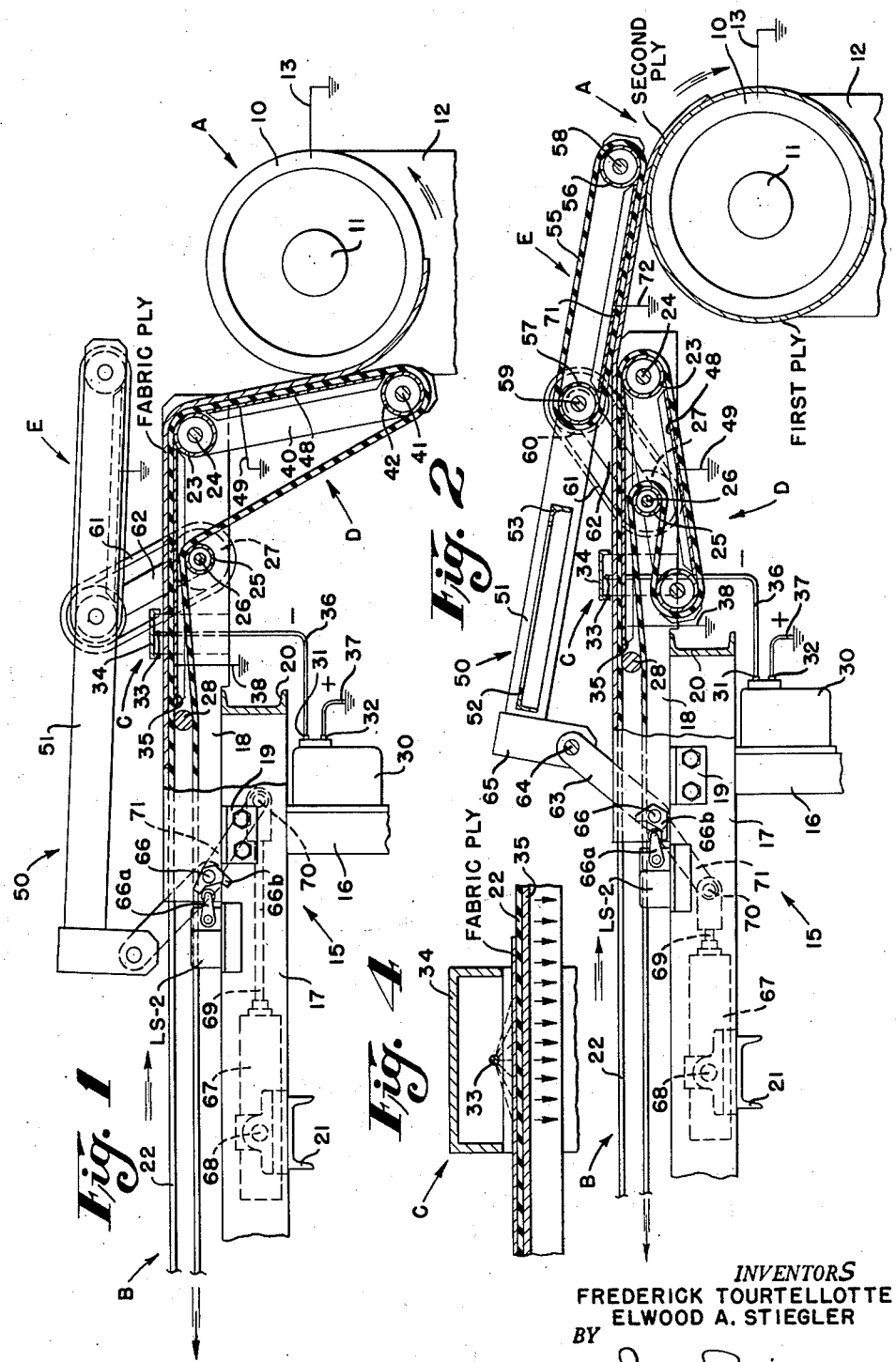

INVENTORS
FREDERICK TOURTELLOTTE
ELWOOD A. STIEGLER
BY
Jack Posin
ATTORNEY.

United States Patent Office 3,071,179
Patented Jan. 1, 1963

3,071,179
TIRE BUILDING APPARATUS AND METHOD
Frederick Tourtellotte, Royal Oak, and Elwood A. Stiegler, Grosse Pointe Park, Mich., assignors to United States Rubber Company, New York, N.Y., a corporation of New Jersey
Filed Mar. 30, 1961, Ser. No. 99,496
6 Claims. (Cl. 156—405)

This invention relates to tire building apparatus, methods, and to the articles made thereby. More particularly, it relates to tire building apparatus and methods which utilize electrostatic charges in the tire building operation, and to the improved tires fabricated thereby.

Carcasses for pneumatic tires are usually built in the form of generally cylindrical bands prior to the operation of shaping and vulcanizing the carcasses. The bands are fabricated upon a rotatable cylindrical tire building drum by winding strips or sheets of calendered bias-cut fabric ply in successive layers about the drum and subsequently adding bead rings and tread material thereto. Depending upon the type of tire being built, additional sheet materials may also be added to the carcasses (e.g. liners, toe strips, sidewall stock, etc.). Since most of the sheet materials used comprise a substantial percentage of uncured rubber or rubberized fabric which readily deforms when stressed, it is advantageous from the standpoint of achieving a high level of uniformity in the finished product to decrease the amount of manual handling involved in fabricating the tire carcasses.

The terms "rubber" and "rubberized" are used in a generic manner in this specification in connection with describing and claiming the materials to which this invention is applicable, and it will be understood that these terms are meant to include natural rubbers, synthetic rubbers and various combinations thereof suitable for use in tire building applications.

In order to decrease the amount of manual handling involved in fabricating tire carcasses and, therefore, to achieve uniformity in the finished product, experiments were conducted to determine whether or not electrostatic principles could be advantageously applied to tire building to handle the sheet rubber materials employed. The results have been salutory in that the use of electrostatics, in accordance with the principles of this invention, permits tires to be built with greater speed, precision and uniformity, thus resulting in superior tire quality at decreased costs.

In the present state of the prior art, the use of electrostatics in tire building presents for satisfactory solution a problem with respect to electrostatically charging the sheet materials, and applying the charged sheets to a tire building drum. One of the major causes of this problem is that the sheets generally are not particularly suited to receiving a charge by conventional methods (e.g. an electrode that contacts the surface of the material being charged). This is due to a number of factors including the following:

(1) The uncured rubber surfaces are tacky and tend to stick to the electrodes, causing a wrinkling of the material and/or a gumming-up of the electrode; and, (2) The surfaces of the sheet materials, rather than being flat, include numerous peaks and valleys that inhibit the establishment of a uniform charge thereon, and, therefore, the peaks tend to receive a high charge, while the valleys tend to receive little, if any, charge.

One form of solution to the foregoing problem, in accordance with this invention, is to pass the sheets through an electrical field in which the charging electrode is spaced from the surface of each passing sheet and has applied thereto a sufficiently high voltage to ionize the space through which the sheets pass. This allows the surfaces of the sheets to, in effect, be uniformly sprayed with charged ions.

The charged sheets are then guided into contact with the tire building drum in a novel manner by improved applicating means which incorporate provisions for utilizing the electrostatic charge to apply the sheets to the drum.

Accordingly, one object of this invention is to provide improved tire building apparatus, methods and improved tires therefrom.

A further object of this invention is to provide improved apparatus and methods for electrostatically charging tire building materials.

Another object of this invention is to provide improved means for conveying and handling electrostatically charged tire building materials.

Further objects and advantages of this invention will become apparent as the following description proceeds.

Briefly stated, and in accordance with one embodiment of this invention, rubberized tire building materials are passed through an ionized air space in an electrical field, thereby becoming electrostatically charged; electrostatic attractive forces are then employed to transfer the materials to applicators which apply the materials to a rotating tire building drum, thereby winding the materials upon the drum.

While the specification concludes with claims particularly pointing out and distinctly claiming the subject matter regarded as this invention, it is believed that the invention will be better understood from the following description taken in conjunction with the accompanying drawings in which:

FIGURE 1 is a side elevational view, with parts cut away for clarity, of an improved tire building apparatus made in accordance with this invention, and showing the apparatus in one condition of operation;

FIGURE 2 is a side elevational view, similar to that shown in FIGURE 1, showing the apparatus in a different condition of operation;

FIGURE 3 is a top-plan view of the tire building apparatus shown in FIGURE 2; and FIGURE 4 is a sectional elevational view, on an enlarged scale, showing details of a means used in this invention for electrostatically charging the tire building materials.

The invention is described herein in connection with the building of a four-ply tire, and particular detail is shown with respect to applying the various bias-cut fabric plies to the drum for this type of tire. However, it will be understood that the apparatus may be used in the building of tires having any standard number of plies rather than just a four-ply tire and, further, that the apparatus may be used to apply sheet materials other than the fabric plies to the drum (e.g. liners, toe strips, sidewall material, etc.). Similarly, in discussing this invention, it will be assumed that the fabric plies have been cut to the proper length before reaching the apparatus however, it will also be understood that a cutting means can be utilized in conjunction with the apparatus to cut the fabric plies to the desired length at the tire building station. One example of a means for cutting plies to proper length before winding the plies on a drum may be seen in the copending application of Clarence M. Parshall, Elwood A. Stiegler, Phillip A. Phillips and Paul Geyer, Serial No. 176,229, filed February 28, 1962, and assigned to the assignee of the present invention.

GENERAL DESCRIPTION

Referring to FIGS. 1 and 2, the apparatus comprises, generally, a tire building station A at which a conventional building drum is located, a conveying means B for delivering rubberized fabric plies to the area of the tire building station, an electrical means C positioned along the conveying means for electrostatically charging a ply as it passes thereby, a first applicating means D for receiving a charged ply from the conveying means and applying the ply to the tire building drum to wind it thereabout in a first direction, and a second applicating means E for receiving a charged ply from the conveying means and applying the ply to the tire building drum to wind it thereabout in a second direction.

During application of the first and third plies of a four-ply tire to the building drum, the drum is rotated counterclockwise and the first applicating means D is in the extended or operative position shown in FIG. 1, while the second applicating means E remains retracted. Similarly, when the second and fourth plies are to be applied to the drum, the drum is rotated clockwise and the second applicating means E is brought into the extended position shown in FIG. 2, while the first applicating means D is retracted.

THE TIRE BUILDING STATION

As may be seen in FIGS. 1, 2 and 3, the tire building station A includes a conventional tire building drum 10 which is drivingly connected by means of a shaft 11 to a reversible electric drive motor 12. The drum 10 may be provided with conventional bead-forming equipment in order to assist an operator in the completion of the tire building operations; however, since the bead-applying and bead-forming operations do not form a part of this invention, such equipment has not been illustrated.

For reasons which will become more apparent hereinafter, the drum 10 should be electrically grounded to the framework of the apparatus, as indicated at 13, to facilitate the electrostatic attraction between the drum and the charged plies being added thereto.

THE CONVEYING MEANS

Referring to FIGS. 1, 2 and 3, it may be seen that the conveying means B (and also the first and second applicating means D and E) are supported on a frame, shown generally at 15, which includes a pair of vertical frame members, one of which is shown at 16, a pair of longitudinal frame members 17, a pair of spaced extension members 18 attached to the longitudinal frame members 17 by means of brackets 19, and a pair of horizontal cross members 20 and 21, all of which are rigidly interconnected to provide a firm foundation for the equipment being supported.

An endless conveyor belt 22 is moveably supported on the frame 15, the upstream end of the belt 22 being carried by a roller (not shown), and the downstream end of the conveyor belt 22 passing about a roller 23. Roller 23 is rotatably carried by a shaft 24 which is suitably journaled adjacent each of its ends in the spaced extension members 18 (FIG. 3), so that the shaft 24 may be rotated within the spaced extension members 18 for reasons which will become apparent hereinafter.

After passing around the downstream roller 23 (FIG. 1), the conveyor belt 22 is directed around the first applicating means D and back up to a roller 25 which is rigidly connected to a shaft 26 that is rotatably supported in the spaced extension members 18. Referring to FIG. 3, it may be seen that the upper (as viewed in the figure) end of shaft 26 extends through the upper extension member 18 and is provided with a driving pulley 27 which serves as a convenient power take-off from the conveyor belt 22. Thus, whenever the conveyor belt 22 is in operation, the roller 25, shaft 26 and, consequently, pulley 27 will also be rotated.

After passing over roller 25, the conveyor belt 22 proceeds under a spacer bar 28 which may be suitably journaled at each of its ends to the spaced extension members 18. Spacer bar 28 serves to prevent the upper and lower portions of the conveyor belt from touching each other during operation. Conveyor belt 22 then proceeds back to the upstream roller (not shown) to complete its endless circuit. The upstream roller may be conventionally driven, the drive including conventional starting and stopping controls which may be manipulated by the operator in conjunction with the tire building operation.

THE ELECTRICAL MEANS

The electrical means C positioned along the conveying means for electrostatically charging the plies as they pass thereby will now be considered.

Referring to FIG. 1, the electrical means C includes a high voltage D.C. power supply 30 mounted on one of the vertical frame members 16 and having a negative output terminal 31 and a positive output terminal 32, a first or charging electrode 33 suitably supported by insulated bushings (not shown) above the conveyor belt 22 and spaced therefrom to provide clearance for the fabric plies to pass therebeneath without contacting the electrode, an insulating shield 34 suitably supported above the first electrode 33, a second or metal-plate electrode 35 positioned below the conveyor belt 22 and in contact with the undersurface thereof, a lead 36 connecting the first electrode 33 to the negative terminal 31 of the power supply, a lead 37 connecting the positive terminal 32 of the power supply 30 to electrical ground, and a lead 38 connecting the second electrode 35 to electrical ground.

It has been found that, depending upon humidity conditions and other related factors, the voltage necessary to ionize the air space between the first electrode 33 and the upper surface of the conveyor belt 22 varies in the neighborhood of 5000 to 10,000 volts. Hence, the operating voltage supplied by the high voltage D.C. power supply 30 must be at least 5000 volts and preferably 10,000–15,000 volts to assure proper ionization of the air space through which the plies pass. In this regard a power supply 30, having a 20,000-volt power transformer such as model 9020–5 manufactured by the Beta Electric Division of Sorensen & Company, Inc., South Norwalk, Connecticut, has been found satisfactory when used with a variable transformer to control the input voltage to the high voltage transformer. The power supply 30 would, of course, be equipped with conventional rectifying equipment to convert the high voltage A.C. output of the power transformer to a suitably rectified D.C. voltage.

Additional factors which must be considered in order to achieve satisfactory electrostatic charging of the plies involve the electrical properties of the conveyor belt 22. In theory, the ideal conveyor belt should have the following characteristics:

(1) It should perform well mechanically;

(2) It should cause a high attractive force between the fabric plies and the metal-plate electrode for a low applied voltage (a maximum value of force per volt applied);

(3) It should maintain the attractive force at a high value for the longest possible time after the energizing voltage has been removed; and (4) It should have a high dielectric strength to minimize the chances of arcing through the belt.

On one hand, the dielectric strength of the belt must be greater than the voltage required for adequate electrostatic attraction. On the other hand, the electrostatic attraction is quite dependent on the belt material used. Hence, a material must be chosen which has a sufficiently high dielectric strength to preclude arcing while maintaining a high attractive force for the operating voltages employed.

A conveyor belt that has been found satisfactory for use in the apparatus of the present invention is a Purotex white, three-ply, standard belt, skim-coated on one side, made by the Ton-Tex Corporation, Grand Rapids, Michigan. Another belt which has been found satisfactory was one made from two plies of square-woven carded American cotton (having 32 ends per inch, 28 picks per inch and a warp and filling of 4′ S/1) which had been passed through an adhesive solution used by United States Rubber Company on square woven cotton, the solution consisting chiefly of natural rubber and vinyl pyridine latex with suitable amounts of curatives and resins. The solutioned fabric had also been skim-coated with a stock chosen for its electrical properties having the ingredients set forth in the following table:

*Table 1*

Ingredients: Parts by weight

| | |
|---|---|
| A non sulphur-modified polychloroprene that is an emulsion polymer of chloroprene; (neoprene w) | 100.00 |
| Titanium dioxide | 70.00 |
| Extra light, calcined, magnesia | 8.00 |
| Zinc oxide | 5.00 |
| A light, rubber processing, petroleum oil used as a rubber softener; (Circo) | 4.00 |
| Phenyl-beta-naphthylamine; (Neozone D) | 3.00 |
| A static atmospheric cracking inhibitor composed of a mixture of waxy materials; (sunproof improved wax | 2.00 |
| Sulphur | 1.00 |
| Diphenyl guanidine | 0.80 |
| Stearic acid | 0.50 |

As previously indicated, the first or charging electrode 33 is positioned above the upper surface of the conveyor belt 22 by a sufficient amount to allow the fabric plies to pass therebeneath without contacting the electrode. Assuming that a voltage of 10,000 volts D.C. is employed, a first electrode made of tungsten wire having a diameter of .007 inch and spaced ½ to ¾ of an inch above the upper surface of the fabric ply carried on the conveyor belt 22 would be a preferred means for initiating the electrostatic charge. Although the foregoing arrangement for the charging electrode 33 has been found to be satisfactory and is illustrated as the preferred embodiment, an alternative arrangement which has been employed and also found to be satisfactory comprises using a charging electrode 33 in the form of a steel or a bronze brush having sharp-pointed bristles directely downwardly towards the fabric plies passing thereunder. In this case the tips of the bristles would also be located ½ to ¾ of an inch above the passing plies to achieve the desired ionization or corona effect in the air space therebeneath.

While two particular arrangements for achieving ionization have been set forth above, numerous other configurations can be devised by those skilled in the art, and it is not intended that the charging electrode arrangement be limited to the particular arrangements shown or described.

As indicated earlier, the second or metal-plate electrode 35 is electrically grounded, as shown at 38, and the positive terminal 32 of power supply 30 is also electrically grounded, as shown at 37. In the preferred embodiment, both the metal-plate electrode 35 and the positive terminal 32 of the power supply are electrically connected to the frame 15 of the apparatus, which in turn may be connected to an electrical ground. However, it will be apparent to those skilled in the art that this type of an arrangement is not absolutely necessary and that the metal-plate electrode 35 can be directly connected to the positive terminal 32 of the power supply to comlete the circuit for the electrostatic charging equipment.

Thus, the term "electrically grounded" is used in the specification and claims covering this invention to mean that the component or electrode under consideration is connected to one of the terminals of the power supply, and, in the preferred embodiment, relates to that component or electrode being connected to the positive terminal 32 of power supply 30.

Upon energizing power supply 30, an electrostatic field develops between the first or charging electrode 33 and the second or metal-plate electrode 35. This has been illustrated more clearly in FIG. 4, wherein the dotted lines emanating from the charging electrode 33 fan out and extend downwardly toward the metal-plate electrode 35. In addition, due to the high voltage employed, the air space between the charging electrode 33 and the upper surface of the fabric ply becomes ionized, with a corona forming about the electrode 33. Since an electrical field exists between electrodes 33 and 35, negatively charged ions in the air spece between the charging electrode 33 and the upper surface of the fabric ply begin moving toward the electrically grounded (or positive) metal-plate electrode 35. This causes the fabric ply passing beneath the charging electrode 33 to, in effect, be sprayed with negative ions and causes the ply to become electrostatically charged.

Since the electrode 35 is at electrical ground (or positive) potential and the fabric ply is negatively charged, the ply is attracted to the metal-plate electrode 35 during its movement along the conveyor belt 22. This attraction has been indicated by the downwardly directed arrows illustrated in FIG. 4.

It is felt appropriate at this point to set forth a number of the advantages obtainable in using a charging electrode which is spaced apart from the fabric being electrostatically charged. One advantage resides in the fact that, as is often the case, the fabric plies employed in the tire building have up-turned ends at their leading edges. If a charging electrode were used which contacts or scrapes the surface of the material being charged, it would be likely to create wrinkles in the fabric passing thereby which would then be deleterious to the subsequent building operation. With a spaced charging electrode, not only is this disadvantage avoided, but the electrostatic forces developed help to iron out any up-turned ends or wrinkles that may already be present in the fabric ply. Additionally, the disadvantage attendant due to the fact that the fabrics used are generally quite lumpy, causing only the high spots thereon to be highly charged, is avoided. This is due to the fact that the spaced charging electrode, in effect, sprays the entire surface of the passing fabric ply with charged ions.

THE FIRST APPLICATING MEANS

Referring to FIGS. 1 and 3, the details of the first applicating means D, which is employed in applying or guiding the first and third plies of a four ply tire onto the tire building drum 10, will now be considered.

As previously indicated, the down-steam roller 23 of the conveying means B is rotatably carried by a shaft 24 which, in turn, is rotatably journaled in the spaced extension members 18 so that shaft 24 can rotate independently of the roller 23 and the extension members 18. The applicating means D is provided with a pair of links 40 which are rigidly connected at one of their ends to the rotatable shaft 24, as by keying or welding, so that upon rotation of shaft 24 the depending links 40 will swing through an arc commensurate with the amount of rotation of the shaft 24. The other ends of the links 40 support a shaft 41 therebetween, and a roller 42 is rotatably carried on shaft 41.

In order to swing the applicating means D from its extended or operative position, at which the first and third plies are guided on to the tire building drum 10 (FIG. 1), to its retracted position (FIG. 2), a pair of rotary hydraulic motors 43 (FIG. 3) are provided. Hydraulic motors 43 are supported from the spaced extension members 18 by means of housings 44 which are rigidly mounted on the extension members 18.

The rotary shaft 24, which is journaled in the spaced extension members 18, projects through the extension members 18 and is provided at its ends with gears 45, which, in turn, are driven by the rotary hydraulic motors 43 by means of worm gears (not shown) carried within the housings 44. Thus, upon rotating the motors 43, the geas 45 will cause the shaft 24 to rotate, and this, in turn, causes the first applicating means D to move into either its extended or retracted position depending upon the direction of rotation of the rotary hydraulic motors 43.

A limit switch LS-1 is provided for electrically controlling the position of applicating means D. Limit switch LS-1 includes an arm 46 that is actuated by a cam 47 which is rigidly connected to the shaft 24. It will be understood that conventional electrical circuitry will be employed in conjunction wtih limit switch LS-1 to control the flow of hydraulic fluid to rotary motors 43, the limit switch serving to sense the arrival of the applicating means D at either its extended or retracted position.

A flat metal-plate electrode 48 (FIG. 1) is suitably carried between the links 40 in such a manner that the upper surface thereof contacts the lower surface of the conveyor belt 22 as it passes between the rollers 23 and 42. Metal-plate electrode 48 is electrically grounded as at 49 in the same manner that metal-plate electrode 35 of the electrical means C is grounded.

It will be remembered that the fabric ply has previously been electrostatically charged to a high potential, opposite to that of the underside of conveyor belt 22, and the ply is, therefore attracted to the belt. As the conveyor belt 22 advances around the roller 23 toward applicating means D, the electrostatic attraction of the ply to the belt prevents the forces of acceleration, which are developed when the ply changes direction about roller 23, from lifting the ply from the belt. Similarly, the attraction of the fabric ply to the underside of the conveyor belt and to the flat metal-plate electrode 48 prevents the fabric ply from sliding down the conveyor belt between rollers 23 and 42 as the ply advances down applicating means D towards the drum 10. As the leading edge of the fabric ply enters the bite between the building drum 10 and the applicating means D, the electrostatic attraction between the electrically grounded drum 10 and the fabric ply, aided by the mechanical adhesion between the ply and the drum, overcomes the electrostatic attraction between the fabric ply and the conveyor belt 22. This results in a transfer of the fabric ply from the applicating means D to the drum 10, and as shown in FIG. 1, the ply begins to wind about the drum.

By synchronizing the speed of the drum with the speed of the conveyor belt 22, a smooth transfer of the fabric ply from the conveyor belt to the tire building drum may be achieved.

As previously indicated, the fabric ply may be cut to the desired length before being brought to the tire building apparatus. Assuming this has been done, when the drum makes one full turn the trailing edge of the fabric ply just overlaps the leading edge of the fabric ply and the overlapped portion passes between the applicating means D and the drum 10 to effect a stitching of the trailing edge to the leading edge of the ply on the drum.

At this point the application of the first ply to the building drum is completed and the applicating means D may be retracted in preparation for the application of the second ply to the drum.

THE SECOND APPLICATING MEANS

The second applicating means E, which is employed in applying or guiding the second and fourth plies of a four ply tire onto the tire building drum 10, will now be described. Applicating means E includes a rectangular supporting structure, shown generally at 50, which is swingable from the retracted position shown in FIG. 1 into the extended position shown in FIG. 2 for applying the fabric plies to the drum 10.

The supporting structure 50 includes (FIG. 3) a pair of longitudinal side members 51 which are held in rigid spaced apart relation by a pair of transverse braces 52 and 53. Braces 52 and 53 are welded or otherwise rigidly fixed to each of the longitudinal side members 51 and are provided with diagonal supports 54 extending therebetween to add rigidity to the supporting structure 50.

Referring to FIG. 2, it may be seen that an endless conveyor belt 55, supported by a downstream roller 56 and an upstream roller 57, is carried by the supporting structure 50. Downstream roller 56 is rotatably carried on a shaft 58 which is rigidly connected at each of its ends to the downstream end of the longitudinal side members 51 (FIG. 3). The upstream roller 57 is supported upon and rotatable with a shaft 59 that is journaled adjacent each of its ends in the longitudinal side members 51. The upper end of shaft 59 (as viewed in FIG. 3) projects through the upper longitudinal side member 51 so that a driven pulley 60 may be rigidly secured thereto. A drive belt 61 interconnects driven pulley 60 with driving pulley 27 in the power take-off from conveying means B. Thus, whenever conveyor belt 22 is being driven, pulley 27 of the power take-off causes pulley 60 to drive conveyor belt 55 of applicating means E. The relationship of pulley and roller diameters involved in driving conveyor belt 55 is such that conveyor belt 55 operates at the same speed as conveyor belt 22, in order, as will subsequently appear, to provide smooth transfer of the fabric plies from the conveying means B to the second applicating means E.

In order to properly guide the supporting structure 50 of applicating means E in its swinging movement between its extended and its retracted positions, two sets of spaced links extend between the supporting structure 50 and the frame 15 of the conveying means B. One set of spaced links has been indicated at 62. Each of spaced links 62 has one of its ends pivotally connected to shaft 59, while the other of its ends is pivotally connected to the shaft 26. The second set of spaced links has been indicated at 63. Each of spaced links 63 has one of its ends pivotally connected to a shaft 64 which extends between end blocks 65 fastened to each of the longitudinal side members 51. The other ends of the links 63 are rigidly secured to a shaft 66 that is rotatably carried in the spaced extension members 18 of the frame 15.

In order to provide a motor source for initiating the swinging movement of the supporting structure 50 and the applicating means E, a reciprocating hydraulic power cylinder or motor 67 is provided (FIG. 2). Hydraulic power cylinder 67 is pivotally mounted on cross member 21 of the frame 15 by means of a pivotal connection 68. A piston rod 69, which is operable within the power cylinder 67 and extends therefrom, is pivotally connected at 70 to one end of a crank arm 71, the other end of the crank arm 71 being rigidly secured to the shaft 66. Thus, as viewed in FIG. 2, when the left end of power cylinder 67 is pressurized, the piston rod 69 moves out of the power cylinder and causes the shaft 66 to be rotated. This, in turn, causes the rectangular supporting structure 50 of the applicating means E to swing from the extended position shown in FIG. 2 to the retracted position shown in FIG. 1. Similarly, actuating the right end of cylinder 67 results in movement back to the position shown in FIG. 2.

As was the case with the first applicating means D, the second applicating means E is also provided with a limit switch LS-2 for electrically controlling the position of the applicating means. Limit switch LS-2 includes an arm 66a that is actuated by a cam 66b which is rigidly connected to shaft 66 for movement therewith.

Applicating means E also includes a metal-plate electrode 71 which is electrically grounded at 72 and serves a similar purpose to the metal-plate electrode 48 of applicating means D.

To insure that the metal-plate electrode 71 maintains good contact with the back surface of conveyor belt 55, it may be found desirable to provide a "floating" connection between the longitudinal side members 51 and the electrode 71. By doing this, and retaining the conveyor belt under relatively high tension to keep it stiff, the force of gravity acting downwardly on the electrode 71 will maintain the electrode in close contact with the back surface of the conveyor belt 55 and will insure subsequent attraction of the fabric plies to the conveyor belt 55. Bias springs may be used to aid the force of gravity in this regard.

Assuming that the first ply of a four ply tire has already been wound about the drum, that first applicating means D has been retracted, and that second applicating means E has been extended (FIG. 2), when the second ply becomes electrostatically charged and its leading edge proceeds toward the downstream end of the conveying means B it passes over and beyond the downstream end of the grounded electrode 35 and comes into the influence of the upstream end of the grounded electrode 71. At this point the force of attraction between the second fabric ply and the grounded electrode 71 starts to become greater than the force of attraction between that portion of the conveyor belt 22 which is downstream of grounded electrode 35 and the fabric ply, and, therefore, the former neutralizes the latter and the fabric ply shifts to the conveyor belt 55, as indicated in FIG. 2. An additional factor involved in the shifting of the fabric ply to the second applicating means E is the inertial and mechanical stiffness of the ply.

It will be understood that the electrostatic attraction between the fabric ply and second applicating means E, is sufficient to overcome the force of gravity that acts to cause the fabric ply to drop, and, hence, the fabric ply moves along with the underside of conveyor belt 55 until it comes into contact with the drum 10 to apply the second (and fourth) ply thereto. It should also be pointed out that the direction of rotation of the drum 10 will have been changed during the time that the first applicating means D was being retracted and the second applicating means E was being extended so that the second ply and fourth ply may be added to the drum while the drum rotates in a clockwise direction (as viewed in FIG. 2).

Upon reaching drum 10, the second ply passes beyond the downstream end of electrode 71 and the attractive force beween the ply and electrode 71 diminishes. Also, since applicating means E brings the leading edge of the ply into contact with the previous plies wound about the drum, the natural tackiness of the fabric causes the second ply to stick to the first ply on the drum and the second ply is then wound about the drum. As before, a slight overlap may be provided for the trailing and leading edges of the second ply and this overlap will be stitched by the applicating means E.

The procedures set forth earlier in connection with applying the first and second plies to the drum would, of course, be repeated in applying the third and fourth (or more) plies to the drum, it being only necessary to correlate the length of each ply with respect to the position it occupies on the building drum.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described our invention, what we claim and desire to protect by Letters Patent is:

1. Tire building apparatus comprising a rotatable tire building drum; electrical means for forming an ionized air space in an electrical field; a generally horizontally disposed conveyor belt of dielectric material for carrying rubberized tire building materials on an upper surface thereof through said ionized air space to the working area of said drum, thereby electrostatically charging said materials; and applicating means movable into and out of an operative position between said conveyor belt and said drum, said applicating means including a movable conveying means of dielectric material having first and second opposed surfaces thereon, and electrode means positioned adjacent one of said surfaces for electrostatically attracting the charged tire building materials against the other of said surfaces when said applicating means is in said operative position, the movement of said conveying means thereby transferring said charged materials from said conveyor belt to said drum.

2. Tire building apparatus comprising a rotatable tire building drum; a generally horizontally disposed conveyor belt of dielectric material having an upper and a lower surface for carrying rubberized fabric plies on the upper surface thereof to the working area of the drum; a first electrode in contact with the lower surface of the conveyor belt; a second electrode positioned above the upper surface of the conveyor belt and spaced therefrom to allow the plies to pass therebeneath without contacting said electrode; electrical means interconnecting said electrodes, said means being adapted to provide a sufficient D.C. potential across said electrodes to ionize the air space between said upper surface and said second electrode and to form an electrical field between said electrodes to thereby electrostatically charge the plies carried by the conveyor belt; and applicating means movable into and out of an operative position extending between said conveyor belt and said drum, said applicating means including: conveying means of dielectric material having first and second opposed, movable surfaces thereon; and, a third electrode in contact with one of said movable surfaces for electrostatically attracting the charged plies against the other of said movable surfaces while the applicating means is in its operative position, whereby the conveying means transfers the charged plies from the conveyor belt to the drum.

3. Tire building apparatus comprising a tire building drum rotatable in a first and a second direction; first conveying means of dielectric material having one end thereof terminating at a point spaced apart from said drum for delivering rubberized fabric plies to the working area of the drum; means for electrostatically charging said plies during their travel along said conveying means; first applicating means movable into and out of an operative position between said end of said conveying means and said drum and including a downstream extension to said conveying means, and an electrode in contact with a first surface on said extension for electrostatically attracting alternate charged plies against a second surface thereon, said applicating means thereby transferring said alternate plies from the conveying means to the drum during rotation of the drum in its first direction; and second applicating means movable into and out of an operative position between said end of said conveying means and said drum and including a second conveying means of dielectric material, and an electrode in contact with a first surface thereon for electrostatically attracting the remaining charged plies against a second surface thereon, said second applicating means thereby transferring said remaining charged plies from the first conveying means to the drum during rotation of the drum in its second direction.

4. A method of building multi-ply tire carcasses on a rotatable tire building drum comprising: placing rubberized fabric plies on a conveyor belt of dielectric material; passing said plies on the conveyor belt through an ionized air space in an electrical field to electrostatically charge said plies; moving said plies on the conveyor belt to a ply applicating mechanism and electrostatically attracting said plies against a moving surface of the ply applicating mechanism, the ply applicating mechanism being movable into and out of an operative position between the conveyor belt and the drum; and, with the ply applicating mechanism in its operative position and its moving surface in contact with the drum during rotation of the latter, transferring said plies from the ply applicating mechanism to the drum to thereby wind a multi-ply tire carcass on the drum.

5. Tire building apparatus comprising an electrically grounded tire building drum rotatable in a first and a second direction; a generally horizontally disposed first conveyor belt of dielectric material having an upper surface and a lower surface for carrying rubberized fabric plies on the upper surface thereof to the working area of the drum; an electrically grounded metallic plate constituting a first electrode in contact with the lower surface of said conveyor belt; a second electrode positioned above the upper surface of said conveyor belt and spaced therefrom a sufficient distance to allow the plies to pass therebeneath without contacting said second electrode; electrical means interconnecting said first and second electrodes and adapted to provide a sufficiently high D.C. potential to ionize the air space between said upper surface and said second electrode and form an electrical field between said first and second electrodes to thereby electrostatically charge the plies carried by said conveyor belt; first applicating means movable into and out of an operative position between said conveyor belt and said drum, said applicating means including a downstream extension to said conveyor belt that contacts said drum when said applicating means is in its operative position, and an electrically grounded metallic plate constituting a third electrode in contact with a lower surface of said extension to said conveyor belt for electrostatically attracting alternate charged plies against an upper surface of said extension, said applicating means thereby transferring said alternate charged plies to the drum during rotation of the drum in its first direction; and second applicating means movable into and out of an operative position between said conveyor belt and said drum, said second applicating means including a second conveyor belt of dielectric material that contacts said drum when said second applicating means is in its operative position, and an electrically grounded metallic plate constituting a fourth electrode in contact with an upper surface of said second conveyor belt for electrostatically attracting the remaining charged plies against a lower surface of said second conveyor belt, said second applicating means thereby transferring said remaining charged plies to the drum during rotation of the drum in its second direction.

6. Apparatus as described in claim 5 wherein said first applicating means further comprises: a pair of laterally spaced apart links pivotally supported adjacent the downstream end of said first conveyor belt; roller means rotatably carried by said links for supporting the downstream extension to said first conveyor belt, said third electrode contacting the lower surface of said downstream extension at a point between said roller means and the downstream end of said first conveyor belt; and means connected to said links for moving said downstream extension into and out of said operative position between said conveyor belt and said drum; and, wherein said second applicating means further comprises: a frame movably positioned above the downstream end of said first conveyor belt; first and second spaced roller means carried by said frame for movably supporting said second conveyor belt on said frame, said fourth electrode contacting said upper surface of said second conveyor belt at a point between said first and second roller means; and means connected to said frame for moving said frame into and out of said operative position between said conveyor belt and said drum.

References Cited in the file of this patent

UNITED STATES PATENTS

| | | |
|---|---|---|
| 1,938,787 | Abbott | Dec. 12, 1933 |
| 2,576,882 | Koole | Nov. 27, 1951 |
| 2,588,207 | Cleland | Mar. 4, 1952 |
| 2,820,716 | Harmon | Jan. 21, 1958 |
| 2,920,679 | Sittel | Jan. 12, 1960 |
| 2,998,051 | Sittel | Aug. 29, 1961 |